July 27, 1926. 1,594,282
C. P. TRIMBLE
CUSHION SEAT AND THE LIKE
Filed Nov. 24, 1923
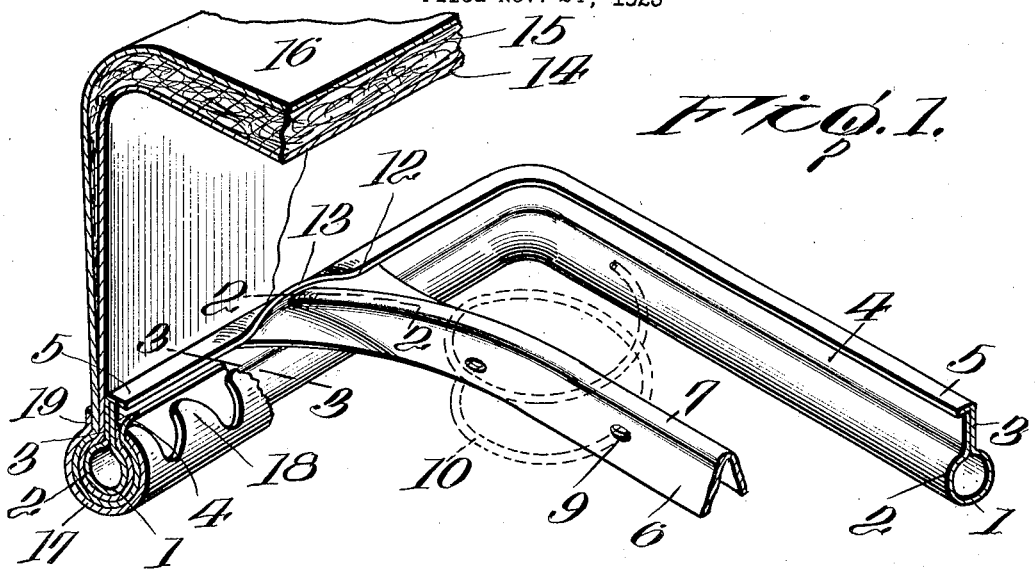
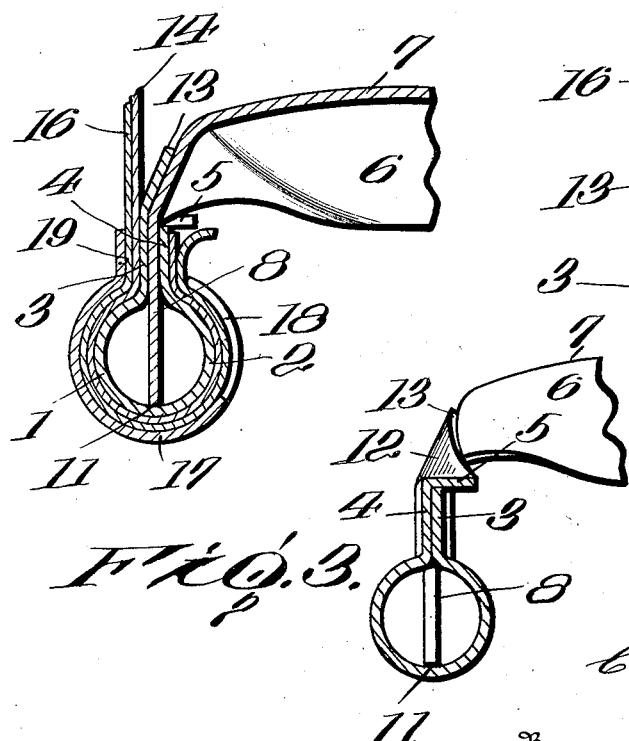
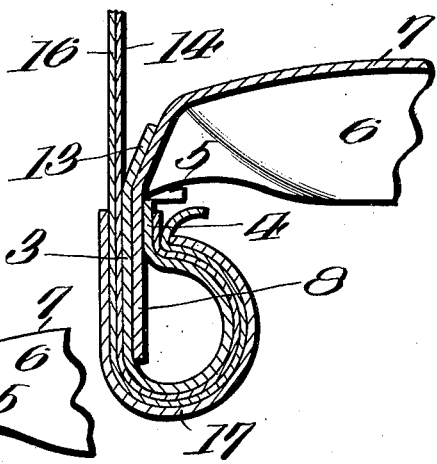
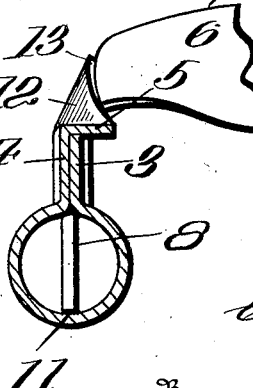
Inventor
Charles P. Trimble
By K. P. McElroy
his Attorney Patented July 27, 1926.

1,594,282

UNITED STATES PATENT OFFICE.

CHARLES P. TRIMBLE, OF PITTSBURGH, PENNSYLVANIA, ASSIGNOR TO FORT PITT BEDDING COMPANY, OF PITTSBURGH, PENNSYLVANIA, A CORPORATION OF PENNSYLVANIA.

CUSHION SEAT AND THE LIKE.

Application filed November 24, 1923. Serial No. 676,720.

This invention relates to cushion seats and the like; and it comprises a seat having a lower border frame provided with a bead and upwardly extending sides, a plurality of spring supporting bars having opposite ends secured between the said sides and advantageously resting on the bottom of the said bead, a cushion cover having a depending skirt wrapped around the bead and clips holding the skirting in place around the bead; all as more fully hereinafter set forth and as claimed.

Cushion seats for automobiles are subjected to severe strains in every direction and therefore should be of rigid and strong construction. At the same time they should be neat in appearance and light in weight. This also applies to seats for railway passenger cars, aeroplanes, etc. The provision of such a light, strong and durable seat is one of the objects of the present invention. Another object of the present invention is the provision of relatively inexpensive cushion seats which can be easily and quickly assembled in the factory.

In the accompanying drawings I have shown one form of the invention.

Fig. 1 is a vertical section taken through one side of the cushion and frame;

Fig. 2 is a vertical section along line 2—2 of Fig. 1 on an enlarged scale;

Fig. 3 is a vertical section along line 3—3 of Fig. 1 on an enlarged scale; and

Fig. 4 is a section similar to Fig. 2 but slightly modified.

Referring to the drawings, 1 indicates the bottom frame of the seat. This is made preferably of stamped metal with a bead formed by the curved sides 2, the lower portion of the frame being substantially circular in cross-section. One side (here shown as the outside) 3 is slightly longer than the other side 4, so there is provided an extremity 5 which may be lapped over the upper edge of the shorter side. The bottom border frame 1 is preferably one piece of metal bent into rectangular shape with meeting ends riveted or welded or otherwise joined. Extending transversely across this frame from side to side are a plurality of spring supporting bars 6, substantially of inverted V-shape, having at their tops reinforcing rib 7 extending to the extremities and having the extremities 8 bent at substantial right-angles and of a length corresponding to the height of the border frame. Each transverse reinforced bar 6 is provided with spaced holes 9 arranged to receive the lowermost convolution of a coiled spring 10 which extends upwardly and the upper ends of which are tied to adjacent springs in a way well understood in the art, for the purpose of resiliently supporting the seat. In assembling the lower border frame, transverse bars 6 are positioned with their downwardly projecting extremities between the sides 3 and 4 of the border frame, advantageously touching the bottom of the border frame inside, as is indicated at 11. The upper edge 5 of the side 3 of the border frame is then turned over by means of a press, so that it overlaps the upper face of the reinforcing bar 6, as is indicated at 12 in Fig. 1. These bars 6 are flattened somewhat at their extremities and there is a substantial contact of the turned over edge 5 with the upper face of each of the reinforcing bars 6. In addition, the edge 5 of the border frame curves around the top of the bars 6, over the reinforcements and, being pressed down securely, firmly engages the bars, as is indicated at 13. This manner of positioning the bars is extremely simple and at the same time results in a strong and secure locking engagement between the bars and the border frame.

The cushion comprises a layer of canvas or other fabric 14, stuffing material of felt, hair or the like 15 and cover of leather or fabric 16. The extreme ends of the lower fabric 14 and the cover 16 are brought down around the outside of the border frame and are held in place by means of the metal clamp 17, which is pressed therearound. This clamp may be of the form shown in Fig. 1, provided with serrations 18, or made of a flat piece of metal without such serrations. The binding member 17 may extend around the entire border frame, or may be put on in sections on the sides and the ends.

In Fig. 4, there is shown a slight modification. The border frame is made with the bead extending entirely inside, so that there is no resultant shoulder on the outside. In other words, the outside 3 of the border frame is straight and the fabric 14 and cover 16, which are held in place by means of the clip 17, are not distorted by this clip, as at 19 (Fig. 1) and there is less danger of tearing the fabric.

The exact shape of the bead of the lower border frame is unimportant, provided it has such a configuration as to cooperate with the clip in holding the fabric in place; but I have found that a border frame having the circular bead shown is economical and simple in manufacture.

What I claim is:—

1. In a cushion seat and the like, a lower border frame having opposite sides arranged to be bridged by a spring supporting member, each said opposite side having two upwardly extending integral members, and transverse spring supporting bars extending from opposite sides of the frame and having downwardly extending ends positioned between the said upwardly extending members, means for preventing longitudinal movement of the bars with respect to the frame and means having a shape approximating the contour of the lower portion of the frame for holding fabric in place thereon.

2. In a cushion seat and the like a lower border frame having opposite sides arranged to be bridged by a spring supporting member, each of the said opposite sides having a bead and two integral members extending upwardly therefrom, transverse spring supporting bars extending from opposite sides of the frame and having downwardly extending ends positioned between the upwardly extending members, means for preventing longitudinal movement of the bars with respect to the frame and means having a shape approximating the bead at the bottom of the frame for holding the fabric in place thereon.

3. A lower border frame for cushion seats and the like comprising a metal member having opposite sides, each side having a body substantially circular in cross section and upwardly extending members, and a plurality of spring supporting bars bridging opposite sides of the frame and having opposite ends secured between the upwardly extending members.

4. A lower border frame for cushion seats and the like comprising a metal member having opposite sides, each of said opposite sides provided with upwardly extending integral members, spring supports having downwardly extending ends positioned between the said members on opposite sides of the frame and one of said members of each side of the frame overlapping the bar and conforming substantially to the shape thereof to prevent longitudinal movement of the bar.

5. A lower border frame for cushion seats and the like comprising a bottom portion having opposite sides, each side provided with two upwardly extending members, transverse bars having downwardly extending ends clamped between the said upwardly extending members, with one of said upwardly extending members being bent over the top of the bar in clamping position and conforming to the irregularities of the bar at contacting points to prevent longitudinal movement thereof.

In testimony whereof, I have hereunto affixed my signature.

CHARLES P. TRIMBLE.